United States Patent
Sartain

(10) Patent No.: US 6,765,074 B2
(45) Date of Patent: Jul. 20, 2004

(54) OLEFIN POLYMERIZATION PROCESS

(75) Inventor: William J. Sartain, West Chester, OH (US)

(73) Assignee: Equistar Chemicals, LP, Houston, TX (US)

(*) Notice: Subject to any disclaimer, the term of this patent is extended or adjusted under 35 U.S.C. 154(b) by 0 days.

(21) Appl. No.: 10/256,494

(22) Filed: Sep. 27, 2002

(65) Prior Publication Data

US 2004/0063876 A1 Apr. 1, 2004

(51) Int. Cl.$^7$ .................................. C08F 4/52
(52) U.S. Cl. .................. 526/153; 526/161; 526/172; 526/134; 526/127; 526/129; 526/130
(58) Field of Search ................. 526/161, 172, 526/134, 126, 130, 943

(56) References Cited

U.S. PATENT DOCUMENTS

| | | | |
|---|---|---|---|
| 4,508,843 A | 4/1985 | Etherton et al. | 502/115 |
| 4,530,913 A | 7/1985 | Pullukat et al. | 502/104 |
| 4,565,795 A | 1/1986 | Short et al. | 502/110 |
| 4,752,597 A | 6/1988 | Turner | 502/104 |
| 4,791,180 A | 12/1988 | Turner | 526/160 |
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,539,124 A | 7/1996 | Etherton et al. | 548/402 |
| 5,554,775 A | 9/1996 | Krishnamurti et al. | 556/7 |
| 5,637,660 A | 6/1997 | Nagy et al. | 526/160 |
| 5,902,866 A | 5/1999 | Nagy et al. | 526/133 |
| 6,211,311 B1 * | 4/2001 | Wang et al. | 526/131 |
| 6,232,260 B1 | 5/2001 | Nagy et al. | 502/155 |
| 6,376,629 B2 * | 4/2002 | Nagy et al. | 526/161 |
| 6,440,889 B1 * | 8/2002 | Tsuie | 502/152 |
| 6,541,583 B2 * | 4/2003 | Meverden et al. | 526/127 |
| 6,583,242 B2 * | 6/2003 | Wang et al. | 526/161 |
| 2001/0056161 A1 * | 12/2001 | Wang et al. | 526/160 |
| 2003/0195306 A1 * | 10/2003 | Tsuie et al. | 526/127 |

FOREIGN PATENT DOCUMENTS

WO   WO 99/24446   5/1999

* cited by examiner

*Primary Examiner*—David W. Wu
*Assistant Examiner*—Rip A. Lee
(74) *Attorney, Agent, or Firm*—Kevin M. Carroll

(57) ABSTRACT

An olefin polymerization process is disclosed. The process comprises polymerizing olefins in the presence of a supported indenoindolyl catalyst system and an organoboron or organoaluminum-treated solid. The supported indenoindolyl catalyst system comprises a support, an organometallic complex comprising a Group 3 to 10 transition or lanthanide metal, M, and at least one indenoindolyl ligand that is π-bonded to M, and an activator. Performing the process in the presence of the organoboron or organoaluminum-treated solid surprisingly leads to an increased activity compared to polymerization processes performed without the treated solid.

20 Claims, No Drawings

OLEFIN POLYMERIZATION PROCESS

FIELD OF THE INVENTION

This invention relates to a process for polymerizing olefins. The process is performed in the presence of a supported indenoindolyl-containing catalyst system and an organoboron or organoaluminum-treated solid. The presence of the organoboron or organoaluminum-treated solid surprisingly leads to an increased activity compared to polymerization processes performed without it.

BACKGROUND OF THE INVENTION

Many olefin polymerization catalysts are known, including conventional Ziegler-Natta catalysts. While these catalysts are inexpensive, they exhibit low activity, produce polymers having narrow to medium molecular weight distributions ($M_w/M_n > 4$), and are generally poor at incorporating α-olefin comonomers. To improve polymer properties, highly active single-site catalysts, in particular metallocenes, are beginning to replace Ziegler-Natta catalysts. Although more expensive, the new catalysts give polymers with narrow molecular weight distributions, and good comonomer incorporation, which allows easier production of low-density polymers. One disadvantage of metallocene catalysts is that they tend to produce lower molecular weight polymers at higher temperatures.

Recent attention has focused on developing improved single-site catalysts in which a cyclopentadienyl ring ligand is replaced by a heteroatomic ring ligand. These catalysts may be referred to generally as "heterometallocenes." One particular type of heterometallocene of interest contains an indenoindolyl ligand as disclosed in U.S. Pat. No. 6,232,260 and PCT Int. Appl. WO 99/24446.

Single-site catalysts are typically soluble in the polymerization reaction medium and are therefore valuable for solution processes. However, for gas-phase, slurry, and bulk monomer processes, it is useful to immobilize the catalyst on a carrier or support in order to control polymer morphology. U.S. Pat. No. 6,211,311 teaches support chemical pretreatment for supported single-site catalysts that contain a polymerization-stable heteroatomic ligand. For catalysts containing indenoindolyl ligands, both U.S. Pat. No. 6,232,260 and PCT Int. Appl. WO 99/24446 disclose that a support such as silica or alumina can be used. Increasing the activity of the polymerization process is an important objective in order to achieve an economical process. As with any chemical process, it is desirable to develop new polymerization methods and catalysts.

In sum, new olefin polymerization processes using supported indenoindolyl-containing catalysts are needed. Particularly valuable processes would have improved catalyst activity.

SUMMARY OF THE INVENTION

The invention is a process for polymerizing olefins. The process is performed in the presence of a supported indenoindolyl-containing catalyst system and an organoboron or organoaluminum-treated solid. The supported indenoindolyl catalyst system comprises a support, an organometallic complex comprising a Group 3 to 10 transition or lanthanide metal, M, and at least one indenoindolyl ligand that is π-bonded to M, and an activator. The presence of the organoboron or organoaluminum-treated solid surprisingly leads to an increased activity compared to polymerization processes that do not use the treated solid. In addition, the presence of the treated solid enhances catalyst operability by reducing the incidence of reactor fouling.

DETAILED DESCRIPTION OF THE INVENTION

The process of the invention comprises polymerizing one or more olefins in the presence of a supported indenoindolyl catalyst system. Supported indenoindolyl-containing catalyst systems include an indenoindolyl-containing complex, an activator, and a support.

The supported catalyst system of the invention contains an organometallic complex comprising a Group 3 to 10 transition or lanthanide metal, M, and at least one indenoindolyl ligand that is π-bonded to M. The metal, M, may be any Group 3 to 10 transition or lanthanide metal. Preferably, the catalyst contains a Group 4 to 6 transition metal; more preferably, the catalyst contains a Group 4 metal such as titanium or zirconium.

The organometallic complex of the invention also contains at least one indenoindolyl ligand that is π-bonded to M. Indenoindolyl ligands are well-known in the art and are taught in U.S. Pat. No. 6,232,260, the teachings of which are incorporated herein by reference. The indenoindolyl ligand is an anionic ligand derived from an indenoindole. An indenoindole is an organic compound that has both indole and indene rings. The five-membered rings from each are fused, i.e., they share two or more carbon atoms. Any of the indenoindolyl ring atoms can be unsubstituted or substituted with one or more groups such as alkyl, aryl, aralkyl, halogen, silyl, nitro, dialkylamino, diarylamino, alkoxy, aryloxy, thioether, or the like. Additional rings can be present, as long as an indenoindole moiety is present.

Suitable indenoindole ligand precursors include, for example, 5,10-dihydroindeno[3,2-b]indole, 4,8,10-trimethyl-5H-indeno[3,2-b]indole, 4-tert-butyl-8-methyl-5,10-dihydroindeno[3,2-b]indole, 4,8-dichloro-5,10-dihydroindeno[3,2-b]indole, 10-methylbenzo[f]-5H-indeno[3,2-b]indole, benzo[g]-5,10-dihydroindeno[3,2-b]indole, 5,10-dihydroindeno[3,2-b]benzo[e]indole, benzo[g]-5,10-dihydroindeno[3,2-b]benzo[e]indole, and the like.

The indenoindolyl ligand is generated by deprotonating a ligand precursor with a base to give an anionic ring system with a high degree of aromaticity (highly delocalized). Reaction of the anion with, e.g., a transition metal halide gives the desired organometallic complex. The indenoindolyl ligand is π-bonded to M in the complex.

The organometallic complex optionally includes one or more additional polymerization-stable, anionic ligands. Examples include substituted and unsubstituted cyclopentadienyl, fluorenyl, and indenyl, or the like, such as those described in U.S. Pat. Nos. 4,791,180 and 4,752,597, the teachings of which are incorporated herein by reference. Suitable ligands also include substituted and unsubstituted boraaryl, pyrrolyl, indolyl, quinolinyl, pyridinyl, and azaborolinyl as described in U.S. Pat. Nos. 5,554,775, 5,539,124, 5,637,660, and 5,902,866, the teachings of which are also incorporated herein by reference. The organometallic complex also usually includes one or more labile ligands such as halides, alkoxys, siloxys, alkyls, alkaryls, aryls, dialkylaminos, or the like. Particularly preferred are halides, alkyls, and alkaryls (e.g., chloride, methyl, benzyl).

The indenoindolyl and/or polymerization-stable ligands can be bridged. Groups that can be used to bridge the ligands include, for example, methylene, ethylene, 1,2-phenylene, dialkylsilyls, and diarylsilyls. Normally, only a single bridge is included, but complexes with two bridging groups can be used. Bridging the ligand changes the geometry around the transition metal and can improve catalyst activity and other properties, such as molecular weight, comonomer incorporation, and thermal stability.

Suitable activators include alumoxanes. Preferred alumoxanes are polymeric aluminum compounds represented by the cyclic formula $(R^1—Al—O)_s$ or the linear formula $R^1(R^1—Al—O)_sAlR^1$ wherein $R^1$ is a $C_1$–$C_5$ alkyl group and s is an integer from 1 to about 20. Preferably, $R^1$ is methyl and s is from about 4 to about 20. Exemplary alumoxane activators are (poly)methylalumoxane (MAO), ethylalumoxane, and diisobutylalumoxane. Optionally, the activator is a trialkyl or triaryl aluminum compound, which preferably has the formula $AlR^2_3$ where $R^2$ denotes a $C_1$–$C_{20}$ hydrocarbyl.

Suitable activators also include substituted or unsubstituted trialkyl or triaryl boron derivatives, such as tris(perfluorophenyl)boron, and ionic borates such as tri(n-butyl)ammonium tetrakis(pentafluorophenyl) boron or trityl tetrakis(pentafluorophenyl) boron. The ionic borates ionize the neutral organometallic compound to produce an active catalyst for olefin polymerization. See, for instance, U.S. Pat. Nos. 5,153,157, 5,198,401, and 5,241,025, all of which are incorporated herein by reference. Suitable activators may be combined or used separately.

The molar ratio of the metal of the activator component to the transition metal of the single-site catalyst is preferably in the range of about 0.3:1 to 1000:1, more preferably from about 20:1 to 800:1, and most preferably from about 30:1 to 500:1. Where the activator is an ionic borate, the molar ratio of the metal of the activator component to the transition metal of the single-site catalyst is preferably in the range of about 0.3:1 to 8:1.

The organometallic complex is immobilized on a support, which is preferably a porous material. The support can be inorganic oxides, inorganic chlorides, and organic polymer resins, or mixtures thereof. Preferred inorganic oxides include oxides of Group 2, 3, 4, 5, 13, or 14 elements. Preferred inorganic chlorides include chlorides of the Group 2 elements. Preferred organic polymer resins include polystyrene, styrene-divinylbenzene copolymers, and polybenzimidizole. Particularly preferred supports include silica, alumina, silica-aluminas, magnesias, titania, zirconia, magnesium chloride, and polystyrene. Silica is most preferred.

Preferably, the support has a surface area in the range of about 10 to about 1000 $m^2/g$, more preferably from about 50 to about 800 $m^2/g$, and most preferably from about 100 to about 700 $m^2/g$. Preferably, the pore volume of the support is in the range of about 0.1 to about 5.0 mL/g, more preferably from about 0.5 to about 4.0 mL/g, and most preferably from about 0.8 to about 3.5 mL/g. The average pore diameter is typically in the range of about 10 to about 1000 Å, preferably about 15 to about 500 Å, and most preferably about 20 to about 350 Å.

The organometallic complex is supported using any of a variety of immobilization techniques. In one method, the organometallic complex is dissolved in a solvent and combined with the support. Evaporation of the solvent gives a supported catalyst. An incipient wetness method can also be used. The activator can also be deposited on the support or it can be introduced into the reactor separately from the catalyst.

The support can be used without any pre-treatment prior to immobilization of the organometallic compound and activator, but a support pre-treatment step is preferred. The support may be calcined and/or modified by a chemical additive. If the support is pre-treated by calcination, the calcination temperature is preferably greater than 150° C. The chemical additives that may be used to pre-treat the support include organoaluminums, organoboranes, organomagnesiums, organosilanes, and organozinc compounds. Preferred chemical additives include alumoxanes, hexamethyldisilazane, trimethylchlorosilane, Grignard reagents, and triethylboron. Support modification techniques are taught in U.S. Pat. Nos. 4,508,843, 4,530,913, and 4,565,795, the teachings of which are incorporated herein by reference.

The process of the invention is also performed in the presence an organoboron or organoaluminum-treated solid. The organoboron or organoaluminum-treated solid is prepared by treating an inorganic solid or an organic polymer solid with an organoboron or an organoaluminum compound.

Suitable organoaluminum compounds include alumoxanes, alkyl aluminums, and alkyl aluminum halides. Suitable alumoxanes include polymeric aluminum compounds represented by the cyclic formula $(R^3—Al—O)_s$ or the linear formula $R^3(R^3—Al—O)_sAlR^3$ wherein $R^3$ is a $C_1$–$C_5$ alkyl group and s is an integer from 1 to about 20. Preferably, $R^3$ is methyl and s is from about 4 to about 20. Exemplary alumoxane activators are (poly)methylalumoxane (MAO), ethylalumoxane, and diisobutylalumoxane.

Preferred alkyl aluminums include trialkyl or triaryl aluminum compound, which preferably has the formula $AlR^4R^5R^6$ where $R^4$, $R^5$, and $R^6$ denote the same or different $C_1$–$C_{20}$ hydrocarbyl. Particularly preferred alkyl aluminums are trimethylaluminum, triethylaluminum, tripropylaluminum, and triisobutylaluminum.

Suitable alkyl aluminum halides include dialkyl aluminum halide and alkyl aluminum dihalide compounds, which preferably have the formula $AlR^4R^5$ or $AlR^4X_2$ where X is Cl, Br, or I. Exemplary alkyl aluminum halides are dimethylaluminum chloride, methylaluminum dichloride, diethylaluminum chloride, ethylaluminum dichloride, diisobutylaluminum chloride and isobutylaluminum dichloride.

Preferred organoboron compounds include alkyl, aryl, and alkoxy boron compounds. More prefered organoboron compounds are trialkylborons, triarylborons, and trialkoxyborons having the formula $R^4R^5R^6B$ or $B(OR^4)(OR^5)(OR^6)$. Most preferred are trimethylboron, triethylboron, tripropylboron, triisobutylboron, trimethoxyboron, triethoxyboron, tripropoxyboron, and triphenoxyboron.

The solid is an inorganic solid or an organic polymer solid, and can be inorganic oxides, inorganic chlorides, and organic polymer resins, or mixtures thereof. Preferred inorganic oxides include oxides of Group 2, 3, 4, 5, 13, or 14 elements. Preferred inorganic chlorides include chlorides of the Group 2 elements. Preferred organic polymer resins include polystyrene, styrene-divinylbenzene copolymers, and polybenzimidizole. Particularly preferred solids include silica, alumina, silica-aluminas, magnesias, titania, zirconia, magnesium chloride, and polystyrene. Silica is most preferred.

Preferably, the solid has a surface area in the range of about 10 to about 1000 $m^2/g$, more preferably from about 50 to about 800 $m^2/g$, and most preferably from about 100 to about 700 $m^2/g$. Preferably, the pore volume of the support is in the range of about 0.1 to about 5.0 mL/g, more preferably from about 0.5 to about 4.0 mL/g, and most preferably from about 0.8 to about 3.5 mL/g. The average pore diameter is typically in the range of about 10 to about 1000 Å, preferably about 15 to about 500 Å, and most preferably about 20 to about 350 Å.

The organoboron or organoaluminum modifier is added to the solid in an amount preferably in the range of about 0.1 to 20 mmoles of aluminum or boron (contained in the modifier) per gram of solid, more preferably from about 0.2 to 10 mmoles/gram, and most preferably from about 0.5 to 5 mmoles/gram. Treatment with organoboron or organoaluminum modifier is typically performed in the liquid phase, and the organoboron or organoaluminum modifier is applied to the solid as a liquid, either by itself or as a solution in a suitable solvent such as a hydrocarbon. An incipient wetness method or gas-phase impregnation may also be used to treat the solid.

The solid is preferably heated at a temperature from about 50° C. to about 1000° C., more preferably from about 100° C. to about 800° C., before and/or after the organoboron or organoaluminum modification. After organoboron or organoaluminum modification, the solid is most preferably dried in vacuum at a temperature from about 20° C. to about 120° C.

The process of the invention is used to polymerize olefins, preferably α-olefins. Suitable olefins include, for example, propylene, 1-butene, 1-hexene, 1-octene, ethylene and the like, and mixtures thereof. The catalyst is valuable for copolymerizing ethylene with α-olefins or di-olefins (e.g., 1,3-butadiene, 1,4-hexadiene, 1,5-hexadiene).

Processes of the invention include liquid phase (slurry, solution, suspension, bulk), high-pressure fluid phase, or gas phase polymerization processes, or a combination of these. The pressure in the polymerization reaction zones typically ranges from about 15 psia to about 30,000 psia, and the temperature usually ranges from about −100° C. to about 300° C.

Surprisingly, olefin polymerization using a supported indenoindolyl catalyst results in significantly higher activity and improved operability when performed in the presence of an organoboron or organoaluminum-treated solid (see Table 1). Polymer properties, including density, remain unchanged.

The following examples merely illustrate the invention. Those skilled in the art will recognize many variations that are within the spirit of the invention and scope of the claims.

EXAMPLE 1
Preparation of Supported Catalyst System
Organometallic Complex Preparation This following describes the synthesis of (cyclopentadienyl)(3,10-dimethylindeno[3,2-b]indolyl) zirconium dichloride, which has the structural formula:

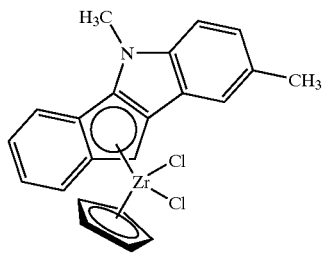

3,10-Dimethyl-5H-indeno[3,2-b]indole is prepared according to the procedure disclosed in U.S. Pat. No. 6,232,260. A 500-mL flask equipped with a stir bar is charged with 3,10-dimethyl-5H-indeno[3,2-b]indole (14.22 g, 60.94 mmol) and dissolved in toluene (175 mL). N-butyl lithium (38 mL, 2.5 M in hexanes, 95.0 mmol) is then added by dropping funnel to the flask under vigorous stirring at room temperature. The reaction mixture is stirred overnight, then the solid precipitate is filtered, and washed with toluene (100 mL) followed by heptane (200 mL). The resulting anionic complex (10.0 g, 42 mmol) and toluene (95 mL) are then added to a 250 mL flask equipped with a stir bar, followed by addition of diethyl ether (35 mL). The anionic complex solution is then added over 15 minutes to a slurry of (cyclopentadienyl)ZrCl$_3$ (11.1 g, 42.0 mmol) in toluene (190 mL) and diethyl ether (190 mL) under vigorous stirring. The mixture is stirred overnight at room temperature, filtered, and the solid product is washed with toluene (200 mL) and dried under vacuum. 16.5 g (77.8% yield) of (cyclopentadienyl)(3,10-dimethylindeno[3,2-b]indolyl) zirconium dichloride is formed.

Supported Catalyst Preparation

In an inert atmosphere glovebox, 1-C$_{18}$H$_{37}$OH (241 mg, 0.892 mmoles) is added slowly to 30% methylaluminoxane (MAO) in toluene (8.3 mL, 38 mmoles Al), and the resulting MAO/1-C$_{18}$H$_{37}$OH solution is stirred at ambient temperature for one hour. A portion of this MAO/1-C$_{18}$H$_{37}$OH solution (3.3 mL, 15 mmoles Al) is added dropwise to Grace Davison 955 silica (4.0 g) slurried in 20 mL toluene. The resulting MAO/silica slurry is stirred at ambient temperature for one hour. The (cyclopentadienyl)(3,10-dimethylindeno[3,2-b]indolyl) zirconium dichloride complex (237 mg, 0.439 mmoles) formed above is added to the balance of the MAO/1-C$_{18}$H$_{37}$OH solution, and the resulting solution is stirred at ambient temperature for one hour. This solution is then added dropwise to the MAO/silica slurry. The resulting slurry is stirred at ambient temperature for 90 minutes and dried under vacuum at 45° C. for 90 minutes to yield 5.77 g of Catalyst 1 as a dry, free-flowing powder.

EXAMPLE 2
Preparation of Organoaluminum-Treated Silica

Grace Davison 955 Silica (4.0 g) is slurried in heptane (20 mL) and triethylaluminum (3.0 mL of 1.6 M solution in heptane) is added dropwise. The slurry is stirred at ambient temperature for one hour, then dried under vacuum at 45° C. for 90 minutes.

EXAMPLE 3
Polymerization Runs

Polymerization experiments are conducted in a jacketed 3.3-liter vessel with a helical agitator, thermocouple, and a valve for removing the resultant polymer. The jacket contains water, which is recirculated for temperature control at 80° C. Catalyst 1 (0.060 g) and a solid additive (0.15 g), if any, is added to the bed through a polyethylene tube. There is no solid additive used in Run 3A, silica is used in Run 3B, and the triethylaluminum-treated silica of Example 2 is used in Runs 3C–3E. The agitator is started and 139 psig of N$_2$ is added to the reactor. Neat 1-hexene (5 mL) is added to the reactor. Ethylene is then added to the reactor to give 300 psig reactor pressure. A mixture of 6.6 weight % 1-hexene in ethylene is fed to maintain 300 psig on the reactor. When the total ethylene fed reaches about 300 grams, the ethylene feed is stopped and the reactor is vented. About 320 g polymer is drained out of the reactor, and the polymerization is repeated three more times to remove the original seed bed. The fourth batch of polymer that is drained from the reactor is submitted for analysis. The results are shown in Table 1.

Runs 3C–3E use the organoaluminum-treated silica prepared in Example 2. Comparative Run 3A does not use any solid additive. Comparative Run 3B uses non-treated silica as the solid additive. The results show that the use of an organoaluminum-treated solid leads to significantly improved catalyst activity.

EXAMPLE 4
Effect of Polymerization Run Length

Polymerization experiments are conducted according to the procedure described in Example 3, with the exception that runs are continued beyond the fourth run until it is necessary to empty the reactor to remove polymer chunks. It becomes necessary to empty the reactor when a sufficient amount of polymer chunks are formed since the reactor stirrer will no longer operate and the ability to control the temperature of the reactor is lost.

The results (shown in Table 2) demonstrate that the use of an organoaluminum-treated solid leads to improved operability of polymerization by reducing reactor fouling.

TABLE 1

Effect of Silica Particle Size on Catalyst Activity

| Run | Additive | Density (g/cm$^3$) | Activity (g/g cat/hr) |
|---|---|---|---|
| 3A* | None | 0.919 | 1880 |
| 3B* | Silica | 0.920 | 2150 |
| 3C | AlEt$_3$/SiO$_2$ | 0.920 | 2490 |
| 3D | AlEt$_3$/SiO$_2$ | 0.920 | 2390 |
| 3E | AlEt$_3$/SiO$_2$ | 0.919 | 2360 |

*Comparative Example

TABLE 2

Effect of Additive on Reactor Fouling

| Run | Additive | Run Length before Reactor Shutdown (min) |
|---|---|---|
| 4A* | None | 3200 |
| 4B* | Silica | 1070 |
| 4C | AlEt$_3$/SiO$_2$ | >4600 |

*Comparative Example

I claim:

1. A process which comprises polymerizing one or more olefins in the presence of a supported indenoindolyl catalyst system comprising a support, an activator, and an organometallic complex comprising a Group 3 to 10 transition or lanthanide metal, M, and at least one indenoindolyl ligand that is π-bonded to M, wherein the process is performed in the presence of an organoboron or organoaluminum-treated solid.

2. The process of claim 1 wherein the support is selected from the group consisting of silica, alumina, silica-alumina, titania, zirconia, magnesia, magnesium chloride, polystyrene, and mixtures thereof.

3. The process of claim 2 wherein the support is silica.

4. The process of claim 1 wherein M is a Group 4–6 transition metal.

5. The process of claim 1 wherein M is a Group 4 transition metal.

6. The process of claim 1 wherein the activator is selected from the group consisting of alumoxanes, neutral boron compounds, and ionic borates.

7. The process of claim 1 wherein the organoboron or organoaluminum-treated solid comprises an inorganic solid or an organic polymer solid selected from the group consisting of silica, alumina, silica-alumina, titania, zirconia, magnesia, magnesium chloride, polystyrene, and mixtures thereof.

8. The process of claim 7 wherein the inorganic solid is silica.

9. The process of claim 1 wherein the organoboron or organoaluminum-treated solid is prepared by treating an inorganic solid or an organic polymer solid with an organoboron or organoaluminum compound selected from the group consisting of alumoxanes, alkyl aluminums, alkyl aluminum halides, and alkyl, aryl, and alkoxy boron compounds.

10. The process of claim 1 wherein the olefin comprises ethylene and a $C_3$–$C_{10}$ α-olefin.

11. A process which comprises polymerizing one or more olefins in the presence of a supported indenoindolyl catalyst system comprising a support, an activator, and an organometallic complex comprising a Group 4 transition metal, M, and at least one indenoindolyl ligand that is π-bonded to M, wherein the process is performed in the presence of an organoaluminum-treated inorganic solid.

12. The process of claim 11 wherein the support is silica.

13. The process of claim 11 wherein the activator is selected from the group consisting of alumoxanes, neutral boron compounds, and ionic borates.

14. The process of claim 11 wherein the inorganic solid is selected from the group consisting of silica, alumina, silica-alumina, magnesia, titania, and zirconia.

15. The process of claim 11 wherein the organoaluminum-treated inorganic solid is prepared by treating an inorganic solid with an alkyl aluminum compound.

16. The process of claim 11 wherein the olefin comprises ethylene and a $C_3$–$C_{10}$ α-olefin.

17. A process which comprises polymerizing one or more olefins in the presence of a supported catalyst system comprising silica, an activator, and an organometallic complex comprising zirconium and at least one indenoindolyl ligand that is π-bonded to zirconium, wherein the process is performed in the presence of an organoboron or organoaluminum-treated silica.

18. The process of claim 17 wherein the activator is selected from the group consisting of alumoxanes, neutral boron compounds, and ionic borates.

19. The process of claim 17 wherein the organoaluminum-treated silica is prepared by treating silica with an alkyl aluminum compound.

20. The process of claim 19 wherein the alkyl aluminum compound is selected from the group consisting of trimethyl aluminum, triethyl aluminum, and triisobutyl aluminum.

* * * * *